(12) United States Patent
Maddocks et al.

(10) Patent No.: US 10,755,248 B2
(45) Date of Patent: Aug. 25, 2020

(54) METHOD AND DEVICE FOR DIGITAL PAYMENT TRANSACTIONS

(71) Applicant: Mastercard Asia/Pacific Pte. Ltd., Singapore (SG)

(72) Inventors: Ian David Alan Maddocks, Broughton (GB); Syam Sasidharan Nair, Kerala (IN)

(73) Assignee: MASTERCARD ASIA PACIFIC PTE. LTD., Singapore (SG)

( * ) Notice: Subject to any disclaimer, the term of this patent is extended or adjusted under 35 U.S.C. 154(b) by 122 days.

(21) Appl. No.: 15/728,362

(22) Filed: Oct. 9, 2017

(65) Prior Publication Data

US 2018/0101830 A1   Apr. 12, 2018
US 2018/0322479 A9   Nov. 8, 2018

(30) Foreign Application Priority Data

Oct. 11, 2016   (SG) ............... 10201608491Q

(51) Int. Cl.

| | |
|---|---|
| *G06Q 20/10* | (2012.01) |
| *G06Q 20/32* | (2012.01) |
| *G06Q 20/36* | (2012.01) |
| *G06Q 20/38* | (2012.01) |
| *G06Q 20/40* | (2012.01) |
| *G07F 7/12* | (2006.01) |
| *G06Q 30/02* | (2012.01) |
| *G07F 7/08* | (2006.01) |
| *G06Q 20/34* | (2012.01) |

(52) U.S. Cl.
CPC ....... *G06Q 20/105* (2013.01); *G06Q 20/3274* (2013.01); *G06Q 20/352* (2013.01); *G06Q 20/3563* (2013.01); *G06Q 20/367* (2013.01); *G06Q 20/3821* (2013.01); *G06Q 20/409* (2013.01); *G06Q 20/4018* (2013.01); *G06Q 30/0207* (2013.01); *G07F 7/0846* (2013.01); *G07F 7/0866* (2013.01); *G07F 7/122* (2013.01)

(58) Field of Classification Search
CPC .. G06Q 20/05; G06Q 20/3274; G06Q 20/352; G06Q 20/367; G06Q 30/0207; G06Q 20/10; G06Q 20/32; G06Q 20/36
See application file for complete search history.

(56) References Cited

U.S. PATENT DOCUMENTS

| | | | |
|---|---|---|---|
| 5,023,436 A | * | 6/1991 | Takada ............. G06K 7/084 235/375 |
| 8,002,193 B2 | | 8/2011 | Faith et al. |
| 8,381,995 B2 | | 2/2013 | Faith et al. |

(Continued)

*Primary Examiner* — Robert R Niquette
(74) *Attorney, Agent, or Firm* — Armstrong Teasdale LLP

(57) ABSTRACT

A method and device for digital payment transactions is provided. A method for encoding data for use in a digital payment transaction between a cardholder and a merchant includes generating, by a cardholder electronic device, dynamic magnetic stripe data associated with a digital payment card of a digital wallet application stored in a data storage module of the cardholder electronic device, retrieving merchant-related data stored in the data storage module of the cardholder electronic device, and encoding, by the cardholder electronic device, the generated dynamic magnetic stripe data and the retrieved merchant-related data in a machine-readable visual code for use in the digital payment transaction.

15 Claims, 2 Drawing Sheets

(56) References Cited

U.S. PATENT DOCUMENTS

| | | | |
|---|---|---|---|
| 8,788,418 B2 | 7/2014 | Spodak et al. | |
| 9,129,270 B2 | 9/2015 | Spodak | |
| 9,195,926 B2 | 11/2015 | Spodak | |
| 9,218,557 B2 | 12/2015 | Spodak et al. | |
| 2010/0125495 A1* | 5/2010 | Smith | G06Q 20/3223 |
| | | | 705/14.23 |
| 2013/0173372 A1* | 7/2013 | Misra | G06Q 30/0222 |
| | | | 705/14.23 |
| 2014/0052630 A1* | 2/2014 | Bona | G06K 19/06187 |
| | | | 705/41 |
| 2014/0108241 A1 | 4/2014 | Tunnell et al. | |
| 2015/0088674 A1* | 3/2015 | Flurscheim | G06Q 20/3276 |
| | | | 705/17 |
| 2016/0027017 A1* | 1/2016 | Chitragar | G06Q 20/4018 |
| | | | 705/71 |
| 2017/0132613 A1 | 5/2017 | Tunnell et al. | |

* cited by examiner

METHOD AND DEVICE FOR DIGITAL PAYMENT TRANSACTIONS

CROSS REFERENCE TO RELATED APPLICATIONS

This patent application claims priority to Singapore Application No. 10201608491Q filed on Oct. 11, 2016, the disclosure of which is incorporated by reference herein in its entirety as part of the present application.

BACKGROUND

The present disclosure relates broadly, but not exclusively, to methods and devices for digital payment transactions.

Traditionally, payment cards such as credit or debit cards have a magnetic stripe on the back of the card. Information relating to the particular credit or debit card (such as account number, card expiry date, etc.) is recorded on the magnetic stripe. To initiate an electronic financial transaction using a payment card with a magnetic stripe, the card is swiped through a magnetic stripe reader that is communicatively coupled with a merchant's point of sale (POS) terminal.

Recently, proximity payment (also known as "contactless") systems are becoming more popular. In addition to (or instead of) having a magnetic stripe, contactless payment cards have a radio frequency identification (RFID) chip and antenna embedded in the body of the card. Instead of swiping the payment card through the magnetic stripe reader at the merchant's POS terminal, the contactless payment card is brought into close proximity to a reader that is communicatively coupled with the merchant's POS terminal.

A consumer's mobile device with a suitable RFID chip and antenna (e.g. a smartphone, tablet computer, etc.) can be used as a proximity payment ("contactless") payment device. The RFID chip stores payment card details to be wirelessly transmitted (e.g. via near field communication (NFC) protocol) to a reader that is communicatively coupled with the merchant's POS terminal.

However, many merchants do not have equipment for participating in proximity payment (contactless) transactions. That is, most merchants only have magnetic stripe acceptance systems. Implementing and installing proximity payment (contactless) systems is an extensive and costly undertaking by all stakeholders (merchants, financial institutions, etc.). As a result, consumers with contactless payment cards/devices are unable to benefit from the relative security and convenience associated with contactless payment schemes.

A need therefore exists to provide methods and system for digital payment transactions that seek to address at least some of the above problems.

BRIEF DESCRIPTION

A first aspect of the present disclosure provides a method for encoding data for use in a digital payment transaction between a cardholder and a merchant, including generating, by a cardholder electronic device, dynamic magnetic stripe data associated with a digital payment card of a digital wallet application stored in a data storage module of the cardholder electronic device, retrieving merchant-related data stored in the data storage module of the cardholder electronic device, and encoding, by the cardholder electronic device, the generated dynamic magnetic stripe data and the retrieved merchant-related data in a machine-readable visual code for use in the digital payment transaction.

The merchant-related data may include one or more of: merchant loyalty-program data, discount data, and coupon data, for use within the digital payment transaction. The machine-readable visual code may include a Quick Response Code (QR-code). The dynamic magnetic stripe data may include one or more of: ISO 7813 Track 1, Track 2, and Track 3 data.

The method may further include transmitting a token request from the cardholder electronic device to a token service computer server that is in communication with the cardholder electronic device, receiving a token by the cardholder electronic device from the token service computer server in response to the token request, and generating the dynamic magnetic stripe data based on the received token. The dynamic magnetic stripe data may include dynamic CVC data.

The method may further include displaying, by a display module of the cardholder electronic device, the machine-readable visual code.

The merchant-related data stored in the data storage module of the cardholder electronic device may include data associated with a plurality of different merchants, and wherein the method may further include receiving, at the cardholder electronic device, a selection of one of the plurality of different merchants, and retrieving the merchant-related data that is related to the selected one of the plurality of different merchants.

A second aspect of the present disclosure provides a cardholder electronic device for use in a digital payment transaction, including a mobile device processor module, a communications module for transmitting and receiving data, the communications module operably connected to the mobile device processor module, and a data storage module operably connected to the mobile device processor module and having stored therein a digital wallet application, merchant-related data and instructions configured to cause the mobile device processor module to: generate dynamic magnetic stripe data associated with a digital payment card of the digital wallet application, retrieve the merchant-related data stored in the data storage module, and encode the generated dynamic magnetic stripe data and the retrieved merchant-related data in a machine-readable visual code for use in the digital payment transaction.

The merchant-related data may include one or more of: merchant loyalty-program data, discount data, and coupon data, for use within the digital payment transaction. The machine-readable visual code may include a Quick Response Code (QR-code). The dynamic magnetic stripe data may include one or more of: ISO 7813 Track 1, Track 2, and Track 3 data.

The mobile device processor module may be further caused to: transmit a token request to a token service computer server that is in communication with the cardholder electronic device, receive a token from the token service computer server in response to the token request, and generate the dynamic magnetic stripe data based on the received token. The dynamic magnetic stripe data may include dynamic CVC data.

The cardholder electronic device may further include a display module operably connected to the mobile device processor module, wherein the display module may be configured to display the machine-readable visual code.

The merchant-related data stored in the data storage module may include data associated with a plurality of different merchants. The cardholder electronic device may further include a user input module operably connected to the mobile device processor module, the user input module configured to receive a user selection of one of the plurality of different merchants, and wherein the mobile device processor module may be further caused to retrieve the merchant-related data that is related to the user selected one of the plurality of different merchants.

A third aspect of the present disclosure provides a merchant device for use in a digital payment transaction between a cardholder and a merchant, including a visual code scanner module for reading a machine-readable visual code having encoded therein dynamic magnetic stripe data and merchant-related data, a processor module operably connected to the visual code scanner module for separating the dynamic magnetic stripe data from the merchant-related data, and a transmitter module operably connected to the processor module for: transmitting the merchant-related data to a merchant payment device such that transaction data can be generated by the merchant payment device based on the merchant-related data, and transmitting the dynamic magnetic stripe data to the merchant payment device for authorizing the digital payment transaction.

The merchant-related data may include one or more of: merchant loyalty-program data, discount data, and coupon data, for use within the digital payment transaction. The machine-readable visual code may include a Quick Response Code (QR-code). The dynamic magnetic stripe data may include one or more of: ISO 7813 Track 1, Track 2, and Track 3 data.

The transaction data may include a price of a product to be purchased by the cardholder from the merchant, and wherein the price of the product may be adjusted by the merchant payment device based on the discount data or coupon data.

BRIEF DESCRIPTION OF THE DRAWINGS

Embodiments will be better understood and readily apparent to one of ordinary skill in the art from the following written description, by way of example only, and in conjunction with the drawings, in which.

DETAILED DESCRIPTION

Figure 1:
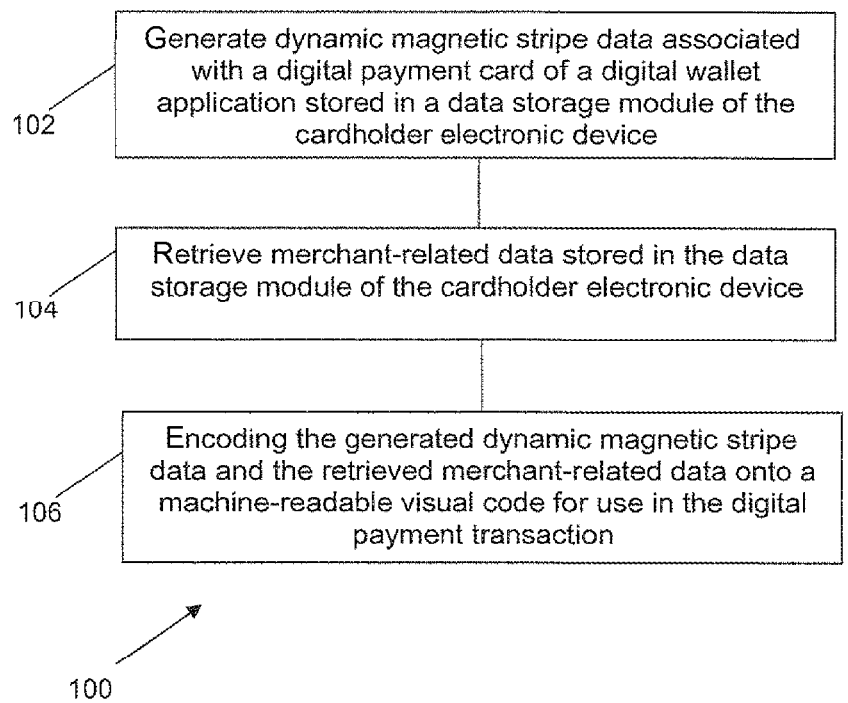
FIG. 1 shows a flow chart illustrating a method for encoding data for use in a digital payment transaction, according to an example embodiment.

Embodiments will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic, or optical signals capable of being stored, transferred, combined, compared, and otherwise manipulated.

Unless specifically stated otherwise, and as apparent from the following, it will be appreciated that throughout the present specification, discussions utilizing terms such as "receiving", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission, or display devices.

The present disclosure also discloses apparatus for performing the operations of the methods. Such apparatus may be specially constructed for the required purposes, or may include a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description below.

In addition, the present disclosure also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

FIG. 1 shows a flow chart illustrating a method 100 for encoding data for use in a digital payment transaction, according to an example embodiment. Step 102 of the data encoding method 100 involves generating, by a cardholder electronic device, dynamic magnetic stripe data associated with a digital payment card of a digital wallet application stored in the cardholder electronic device.

An example of the consumer/cardholder electronic device is a mobile electronic device (e.g. a smartphone, tablet computer, etc.) that can be used as a proximity payment (i.e. "contactless") payment device. Further details on the cardholder electronic device will be provided below.

The digital wallet application is stored in a data storage module of the cardholder electronic device. The data storage module is preferably a secured memory of the device or secure element that is tamper-resistant and configured for securely storing data. The digital wallet application (also known as "mobile wallet") is an electronic wallet configured to store and transmit payment credentials for one or more payment card accounts. The use of electronic wallets to store and transmit payment credentials will be apparent to persons skilled in the art. Each of the one or more payment card accounts typically has a corresponding digital (or virtual) payment card. The consumer can select the appropriate payment card account to use by selecting the corresponding digital payment card via a user interface of the digital wallet application, just as he/she would do in real-life when selecting and presenting a payment card to a cashier during check-out for a "card-present" transaction.

The dynamic magnetic stripe data includes one or more of: ISO 7813 standard Track 1, Track 2, and Track 3 data. Conventionally, the Track 1 data includes (but is not limited to): a cardholder's name, a primary account number (PAN)/payment card number which is typically 16 digits but can be up to 19 digits, an expiration date of the payment card, a service code, and a Card Verification Value or Card Verification Code (CVC). Track 2 data includes (but is not limited to): a primary account number (PAN)/payment card number, an expiration date of the payment card, a three digit service code, and discretionary data. Where the magnetic stripe data is dynamic it may include dynamic CVC cryptogram, unpredictable number, and a transaction counter (ATC) data.

Prior to the step 102 of generating the dynamic magnetic stripe data associated with a particular digital payment card, the following steps may be performed. The first step involves transmitting a token request from the cardholder electronic device to a token service computer server that is in communication with the cardholder electronic device. At the second step, in response to the token request, the cardholder electronic device receives a token from the token service computer server. In this manner, the dynamic magnetic stripe data can be generated based on the received token. The received token may be stored in the secured memory or secure element of the data storage module.

As will be apparent to persons skilled in the art, tokenization is primarily used to secure payment card data. The process of tokenization replaces sensitive data with surrogate values, i.e. tokens. In other words, tokens are used in place of sensitive data throughout the channel ecosystem, or token domain, until they can be mapped back (de-tokenized), in a secure environment, to the original value allowing any subsequent processing or reconciliation to take place. In an EMV® payments context, the EMVCo Payment Tokenization Specification for payment cards requires the replacement of the card's primary account number (PAN) with an alternate unique identification number, or 'token'. To allow this token to be processed over the EMVCo stakeholders' existing payments infrastructure, the token is formatted to look like a PAN. This enables transaction routing and satisfies legacy validation checks.

During the tokenization process, the PAN is sent to, and stored on, a centralized and highly secure server called a token 'vault'. This PAN is held in the token vault with information on its relationship to the one or more unique tokens that represent it in different token domains. Whenever one of the tokens is used for a transaction, it is identified as a token allowing the token vault to be consulted to confirm the real PAN so that the transaction can be authorized. The process removes the real PAN information from environments where data can be vulnerable and, if stolen, used for fraudulent purposes. By making tokens domain-specific, secure segregation of payments data is enabled, for example, a token designated for mobile NFC payments cannot be used in place of a card-on-file token for an e-commerce merchant. This segregation allows appropriate levels of security and domain-specific risk management to be implemented separately for each domain, and only restricted by that domain's limitations.

Step 104 of the method 100 involves retrieving merchant-related data stored in a data storage module of the cardholder electronic device. The data storage module can be a non-secure element, secured memory, or a secure element that is the same environment as the one having the digital wallet application, or a secure element that is different from the one having the digital wallet application.

The merchant-related data includes one or more of: merchant loyalty-program data, discount data, and coupon data. These data are preferably used within the digital payment transaction. For example, the merchant loyalty-program data can include "reward points" issued to a cardholder for past purchases at a particular merchant. The cardholder can use these "reward points" to offset the price of subsequent purchases at the particular merchant. The discount data may be a single-use discount on a purchase of a particular item at the merchant or can be a discount on an entire transaction. Similarly, the coupon data may be a single-use offer on a purchase of a particular item at the merchant (e.g. "buy 1 and get one free" offer) or can be an offer that applies to an entire transaction.

The merchant-related data stored in the cardholder electronic device may include data associated with a plurality of different merchants. In other words, each merchant has its respective merchant-related data (merchant loyalty-program data, discount data, coupon data, etc.) stored in the cardholder electronic device. A cardholder can select the appropriate merchant (and consequently, the appropriate merchant-related data) by using a merchant-specific mobile application installed on the cardholder electronic device. For example, if a cardholder is at merchant XYZ's premises, he/she can select merchant "XYZ" using a user input module (e.g. keypad, touchscreen) of the cardholder electronic device to utilize or access the merchant-related data corresponding to merchant "XYZ". Accordingly, a user selection of one of the plurality of different merchants is received at the cardholder electronic device. Subsequently, the merchant-related data that is related to the selected one of the plurality of different merchants is retrieved.

Step 106 of the method 100 involves encoding, by the cardholder electronic device, the generated dynamic magnetic stripe data (from step 102) and the retrieved merchant-related data (from step 104) in a machine-readable visual code for use in the digital payment transaction. The machine-readable visual code is preferably a Quick Response Code (QR-code), but can be any suitable one-dimensional (1D) or two-dimensional (2D) machine-readable visual (optical) code. The machine-readable visual code is preferably displayed on a display module (e.g. touchscreen) of the cardholder electronic device.

It will be appreciated that some of the steps described above are not necessarily performed sequentially, in particular, step 104 can be performed before 102, or steps 102 and 104 can be performed in parallel.

Figure 2:
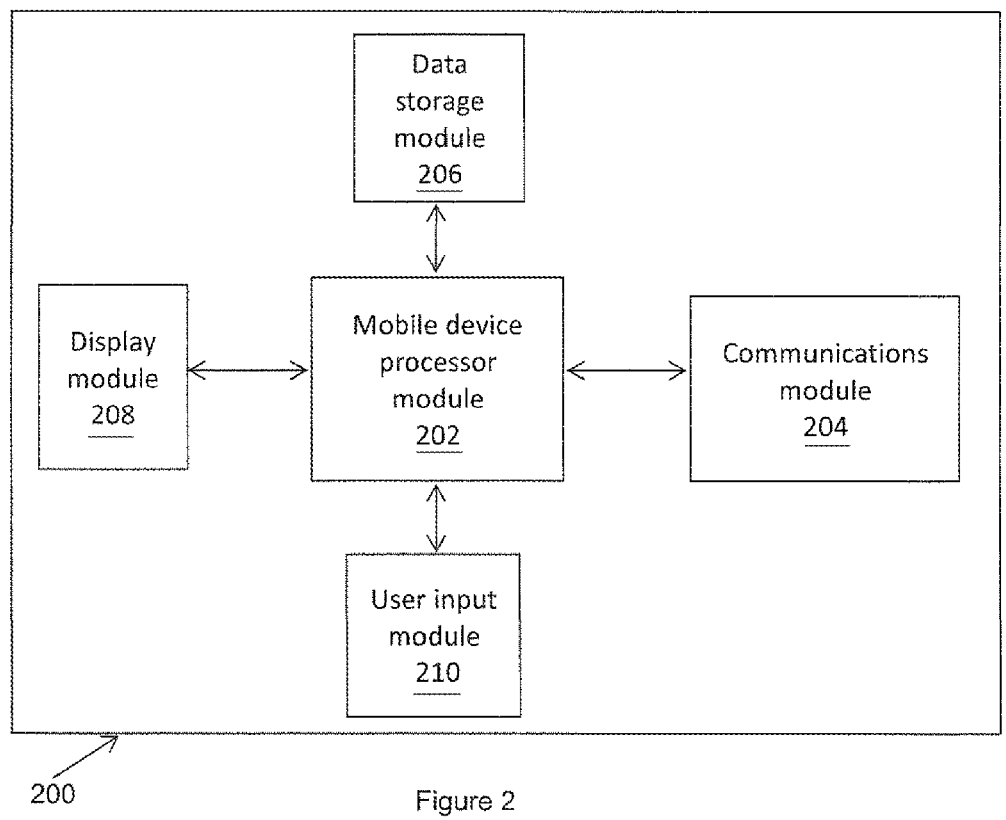
FIG. 2 shows a schematic of a cardholder electronic device for use in a digital payment transaction, according to an example embodiment.

FIG. 2 shows a schematic of a cardholder electronic device 200 for use in a digital payment transaction, according to an example embodiment. The cardholder electronic device 200 includes a mobile device processor module 202, a communications module 204 for transmitting and receiving data, and a data storage module 206. The communications module 204 and data storage module 206 are operably connected to the mobile device processor module 202. The data storage module 206 may include one or more secured memory areas (not shown) that that are tamper-resistant and configured for securely storing data. A digital wallet application and merchant-related data are stored in the one or more memory areas of the data storage module 206. Additionally, the data storage module 206 stores instructions configured to cause the mobile device processor module 202 to: generate dynamic magnetic stripe data associated with a digital payment card of the digital wallet application, retrieve the merchant-related data stored in the data storage module, and encode the generated dynamic magnetic stripe data and the retrieved merchant-related data in a machine-readable visual code for use in the digital payment transaction.

The merchant-related data includes one or more of: merchant loyalty-program data, discount data, and coupon data for use within the digital payment transaction. The machine-readable visual (optical) code is preferably a Quick Response Code (QR-code), but can be any suitable one-dimensional (1D) or two-dimensional (2D) machine-readable visual (optical) code. The dynamic magnetic stripe data may include one or more of: ISO 7813 Track 1, Track 2, and Track 3 data. The ISO 7813 Track 1 and/or Track 2 may include dynamic CVC data.

In order to generate the dynamic magnetic stripe data, the mobile device processor module 202 can be further caused to: transmit a token request to a token service computer server (not shown in FIG. 2) that is in communication with the cardholder electronic device and receive a token from the token service computer server in response to the token request. The dynamic magnetic stripe data is then generated based on the received token.

The cardholder electronic device 200 further includes a display module 208 that is operably connected to the mobile device processor module 202. The display module 208 is configured to display the generated machine-readable visual code.

The merchant-related data stored in the data storage module 206 can include data associated with a plurality of different merchants. In an implementation, the cardholder electronic device 200 further includes a user input module 210 operably connected to the mobile device processor module 202. The user input module 210 is configured to receive a user selection of one of the plurality of different merchants. The mobile device processor module 202 is further caused to retrieve, from the data storage module 206, the merchant-related data that is related to the user selected one of the plurality of different merchants.

Figure 3:
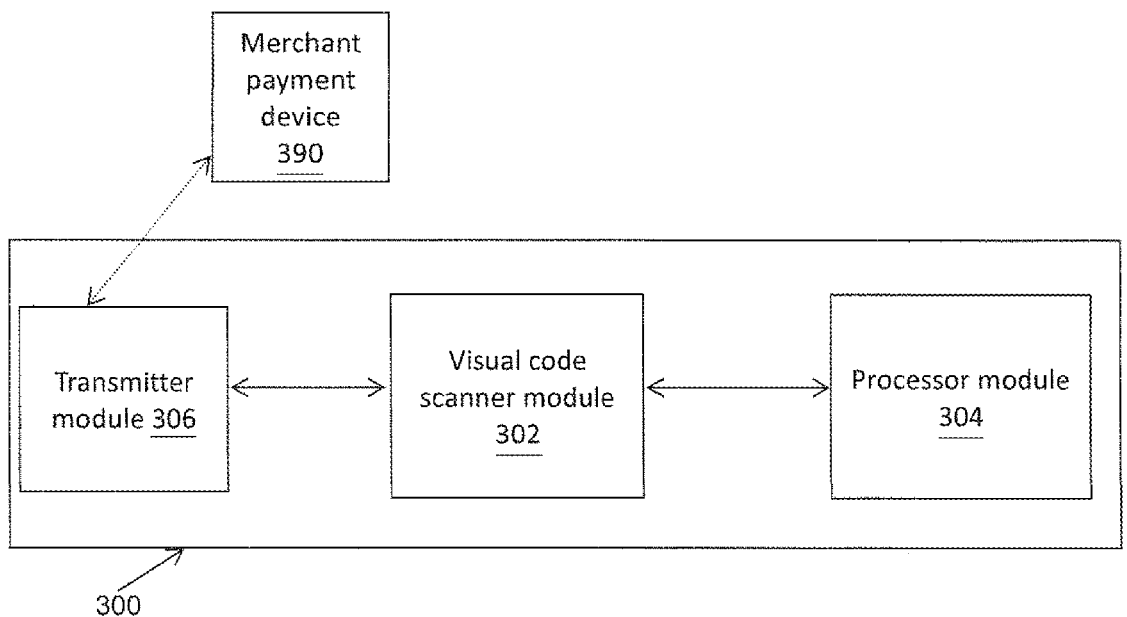
FIG. 3 shows a schematic of a merchant device for use in a digital payment transaction, according to an example embodiment.

FIG. 3 shows a schematic of a merchant device 300 for use in a digital payment transaction, according to an example embodiment. The merchant device 300 is located at a merchant's premises and includes a visual code scanner module 302 for reading a machine-readable visual code having encoded thereon dynamic magnetic stripe data and merchant-related data, as described above. For example, the visual code scanner module 302 reads the machine-readable visual code displayed on the display module 208 of the cardholder electronic device 200. The merchant device 300 also includes a processor module 304 operably connected to the visual code scanner module 302 for separating the dynamic magnetic stripe data from the merchant-related data after the visual code scanner module 302 reads and extracts the machine-readable visual code. The merchant device 300 further includes a transmitter module 306 operably connected to the processor module for (i) transmitting the merchant-related data to a communicatively coupled merchant payment device (e.g. a merchant point-of-sale terminal 390) such that transaction data can be generated by the merchant payment device 390 based on the merchant-related data, and (ii) transmitting the dynamic magnetic stripe data to the merchant payment device 390 for authorizing the digital payment transaction. Further processing of the digital payment transaction after receipt of the dynamic magnetic stripe data by the merchant payment device will be apparent to persons skilled in the art.

The merchant-related data includes one or more of: merchant loyalty-program data, discount data, and coupon data, for use within a particular digital payment transaction. The machine-readable visual code includes a Quick Response Code (QR-code), and in such a case, the visual code scanner module 302 is a suitable QR-code/bar-code scanner. The dynamic magnetic stripe data includes one or more of: ISO 7813 Track 1, Track 2, and Track 3 data.

The transaction data may include a price of a product that is to be purchased by the cardholder from the merchant. In such a case, the price of the product is adjusted by the merchant payment device based on the discount data or coupon data. For example, if the discount data corresponds to a 20% discount on a particular product that originally costs $100, the price of the particular product is adjusted by 20% (i.e. $80) and the digital payment transaction is based on the adjusted amount of $80.

The various embodiments described herein advantageously enable consumers to use their contactless payment devices (i.e. consumer mobile devices that include payment circuitry) to securely conduct magnetic stripe card transactions without a need for significant changes to legacy systems of merchants and issuers.

The various embodiments described herein provide magnetic stripe card data to a merchant device to initiate an electronic payment transaction. In particular, a cardholder can use his/her contactless payment-enabled mobile device to conduct a purchase transaction at a merchant retail location using a barcode/QR-code scanner associated with the merchant's point-of-sale (POS) device and issuer processing systems.

In addition, the merchant-related data is also provided to the merchant. Accordingly, cardholders can avoid carrying physical merchant-related cards (e.g. merchant loyalty cards, discount cards) and coupons. If cardholders have a merchant-related mobile application installed on their mobile device, they need not provide the merchant-related data separately from the magnetic stripe card data. That is, the various embodiments described herein can allow cardholders to provide both magnetic stripe card data and merchant-related data to the merchant at the same time.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. A method for encoding data for use in a digital payment transaction between a cardholder and a merchant, the method comprising:
   prior to initiating the digital payment transaction between the cardholder and the merchant, receiving, from the cardholder at a cardholder electronic device associated with the cardholder, a selection of i) a digital payment card of a digital wallet application previously stored in a data storage module of the cardholder electronic device and ii) the merchant, the merchant being one of a plurality of different merchants previously stored in the data storage module of the cardholder electronic device, the cardholder being at a premise associated with the merchant;
transmitting a token request from the cardholder electronic device to a token service computer server in communication with the cardholder electronic device, the token request including information associated with the selected digital payment card, the token service computer server being different from the cardholder electronic device;
in response to transmitting the token request, receiving a token by the cardholder electronic device from the token service computer server;
generating, by the cardholder electronic device based on the received token, dynamic magnetic stripe data associated with the digital payment card of the digital wallet application;
retrieving, by the cardholder electronic device in response to the selection of the merchant by the cardholder, merchant-related data associated with the merchant, the merchant-related data previously stored in the data storage module of the cardholder electronic device;
encoding, by the cardholder electronic device, the generated dynamic magnetic stripe data and the retrieved merchant-related data in a machine-readable visual code for use in the digital payment transaction; and
initiating, by the cardholder electronic device, the digital payment transaction by displaying, on the cardholder electronic device, the machine-readable visual code to the merchant.

2. The method according to claim 1, wherein the merchant-related data comprises at least one of:
merchant loyalty-program data;
discount data; and
coupon data, for use within the digital payment transaction.

3. The method according to claim 1, wherein the machine-readable visual code comprises a Quick Response Code (QR-code).

4. The method according to claim 1, wherein the dynamic magnetic stripe data comprises at least one of: ISO 7813 Track 1, Track 2, and Track 3 data.

5. The method according to claim 1, wherein the dynamic magnetic stripe data comprises dynamic CVC data.

6. A cardholder electronic device for use in a digital payment transaction between a cardholder and a merchant, the cardholder electronic device comprising:
a mobile device processor module;
a communications module for transmitting and receiving data, the communications module operably connected to the mobile device processor module; and
a data storage module operably connected to the mobile device processor module and having stored therein a digital wallet application, merchant-related data, and instructions configured to cause the mobile device processor module to:
prior to initiating the digital payment transaction between the cardholder and the merchant, receive, from the cardholder associated with the cardholder electronic device, a selection of i) a digital payment card of the digital wallet application previously stored in a data storage module of the cardholder electronic device and ii) the merchant, the merchant being one of a plurality of different merchants previously stored in the data storage module of the cardholder electronic device, the cardholder being at a premise associated with the merchant;
transmit a token request from the cardholder electronic device to a token service computer server in communication with the cardholder electronic device, the token request including information associated with the selected digital payment card, the token service computer server being different from the cardholder electronic device;
in response to transmitting the token request, receive a token by the cardholder electronic device from the token service computer server;
generate, in based on the received token, dynamic magnetic stripe data associated with the digital payment card of the digital wallet application;
retrieve, in response to the selection of the merchant by the cardholder, the merchant-related data associated with the merchant, the merchant-related data previously stored in the data storage module;
encode the generated dynamic magnetic stripe data and the retrieved merchant-related data in a machine-readable visual code for use in the digital payment transaction; and
initiate the digital payment transaction by displaying, on the cardholder electronic device, the machine-readable visual code to the merchant.

7. The cardholder electronic device according to claim 6, wherein the merchant-related data comprises at least one of:
merchant loyalty-program data;
discount data; and
coupon data, for use within the digital payment transaction.

8. The cardholder electronic device according to claim 6, wherein the machine-readable visual code comprises a Quick Response Code (QR-code).

9. The cardholder electronic device according to claim 6, wherein the dynamic magnetic stripe data comprises at least one of: ISO 7813 Track 1, Track 2, and Track 3 data.

10. The cardholder electronic device according to claim 6, wherein the dynamic magnetic stripe data comprises dynamic CVC data.

11. The cardholder electronic device according to claim 6, wherein the merchant-related data stored in the data storage module comprises data associated with a plurality of different merchants,
wherein the cardholder electronic device further comprises a user input module operably connected to the mobile device processor module, the user input module configured to receive a cardholder selection of one of the plurality of different merchants.

12. A merchant device for use in a digital payment transaction between a cardholder and a merchant, the merchant device comprising:
a visual code scanner module for reading and extracting a machine-readable visual code generated by a cardholder electronic device, wherein the visual code scanner module is configured to:
scan the machine-readable visual code displayed by the cardholder electronic device to initiate the digital payment transaction, wherein the machine-readable visual code includes dynamic magnetic stripe data and merchant-related data encoded by the cardholder electronic device,
wherein the dynamic magnetic strip data is generated by the cardholder electronic device based on a token received from a token service computer server i) in communication with the cardholder electronic device and ii) being different from the cardholder electronic device, the token received by the cardholder electronic device in response to transmitting a token request from the cardholder electronic device to the token service computer server, the token request including information associated with a selection of a digital payment card by the cardholder at the cardholder electronic device, the digital payment card associated with a digital wallet application previously stored in a data storage module of the cardholder electronic device, and wherein the merchant-related data is retrieved by the cardholder electronic device from the data storage module in response to a selection of the merchant by the cardholder at the cardholder electronic device, the merchant being one of a plurality of different merchants previously stored in the data storage module, the merchant-related data associated with the merchant, the merchant associated with the merchant device;

a processor module operably connected to the visual code scanner module configured to separate the dynamic magnetic stripe data from the merchant-related data in response to the visual code scanner module reading and extracting the machine-readable visual code; and a transmitter module operably connected to the processor module configured to:

transmit the merchant-related data to a merchant payment device such that transaction data can be generated by the merchant payment device based on the merchant-related data; and transmit the dynamic magnetic stripe data to the merchant payment device for authorizing the digital payment transaction.

13. The merchant device according to claim 12, wherein the merchant-related data comprises at least one of:

merchant loyalty-program data;

discount data; and coupon data, for use within the digital payment transaction.

14. The merchant device according to claim 13, wherein the transaction data comprises a price of a product purchased by the cardholder from the merchant, and wherein the price of the product is adjusted by the merchant payment device based on one of the discount data and coupon data.

15. The merchant device according to claim 12, wherein the machine-readable visual code comprises a Quick Response Code (QR-code), and wherein the dynamic magnetic stripe data comprises at least one of: ISO 7813 Track 1, Track 2, and Track 3 data.

* * * * *